United States Patent
Fry

(10) Patent No.: US 11,628,987 B2
(45) Date of Patent: Apr. 18, 2023

(54) PERSONALIZED DRINKING CUP WITH FINGERPRINT READER

(71) Applicant: Tracy Lynn Fry, Columbia, SC (US)

(72) Inventor: Tracy Lynn Fry, Columbia, SC (US)

( * ) Notice: Subject to any disclaimer, the term of this patent is extended or adjusted under 35 U.S.C. 154(b) by 100 days.

(21) Appl. No.: 17/303,554

(22) Filed: Jun. 2, 2021

(65) Prior Publication Data
US 2022/0041349 A1 Feb. 10, 2022

Related U.S. Application Data

(60) Provisional application No. 63/062,273, filed on Aug. 6, 2020.

(51) Int. Cl.

| | | |
|---|---|---|
| *B65D 50/00* | (2006.01) | |
| *B65D 43/02* | (2006.01) | |
| *B65D 47/06* | (2006.01) | |
| *B65D 51/24* | (2006.01) | |
| *A47G 19/22* | (2006.01) | |
| *B65D 53/02* | (2006.01) | |
| *G06V 40/13* | (2022.01) | |
| *H02J 7/00* | (2006.01) | |

(52) U.S. Cl.
CPC ......... *B65D 50/00* (2013.01); *A47G 19/2205* (2013.01); *B65D 43/0229* (2013.01); *B65D 47/065* (2013.01); *B65D 51/242* (2013.01); *B65D 53/02* (2013.01); *G06V 40/13* (2022.01); *H02J 7/0063* (2013.01)

(58) Field of Classification Search
CPC ............ A47G 19/2205; A47G 2400/02; A47G 2400/123; A47G 19/2211; A47G 19/2227; B65D 50/00; B65D 43/0229; B65D 47/065; B65D 51/242; B65D 53/02; B65D 47/305; G06V 40/13; G06V 40/12; H02J 7/0063
See application file for complete search history.

(56) References Cited

U.S. PATENT DOCUMENTS

| | | |
|---|---|---|
| 8,237,541 B2 | 8/2012 | Wang |
| 9,382,107 B2 | 7/2016 | Pfeiffer et al. |
| 9,778,201 B2 | 10/2017 | Lacoste et al. |
| 9,908,673 B2 | 3/2018 | Rogers et al. |
| 10,226,141 B2 | 3/2019 | Brewster et al. |
| 10,433,666 B1 | 10/2019 | Jovanov |
| 10,602,863 B2 | 3/2020 | Lee et al. |
| 10,676,251 B2 | 6/2020 | Krafft |
| 10,872,482 B1 | 12/2020 | Colton et al. |
| 2005/0237006 A1 | 10/2005 | Lee |

(Continued)

*Primary Examiner* — Abhishek Sarma
(74) *Attorney, Agent, or Firm* — Dunlap Bennett & Ludwig, PLLC

(57) ABSTRACT

A personalized drinking cup assembly comprises a lid which includes a mouthpiece, and includes a fingerprint reader located thereon to enable the user to access and use the mouthpiece to drink from the cup. In some embodiments the cap comprises a top portion and a side wall extending perpendicularly therefrom, and the fingerprint reader is located on the side wall. In some embodiments, the cap further comprises a handle, on which the fingerprint reader is located. In use, the user utilizes the fingerprint reader in order to access the mouthpiece for drinking from the cup. Once the fingerprint reader is read and the user is identified as the owner or authorized user of the cup, the mouthpiece will be opened for consumption thereby.

9 Claims, 4 Drawing Sheets

(56) References Cited

U.S. PATENT DOCUMENTS

| | | |
|---|---|---|
| 2008/0140250 A1 | 6/2008 | Dave |
| 2011/0241828 A1* | 10/2011 | Wang .................... B65D 41/04 340/5.53 |
| 2013/0307683 A1 | 11/2013 | Greenberg et al. |
| 2016/0355305 A1* | 12/2016 | Hoskins ............... B65D 51/242 |
| 2018/0078065 A1 | 3/2018 | Cheatham et al. |
| 2019/0357707 A1 | 11/2019 | Bugaj |
| 2019/0367233 A1 | 12/2019 | Cabouli |
| 2020/0227045 A1 | 7/2020 | Fontana |
| 2020/0304324 A1 | 9/2020 | Castle et al. |
| 2020/0390276 A1 | 12/2020 | Walsh |
| 2021/0354891 A1* | 11/2021 | Netter ................ A47G 19/2205 |

\* cited by examiner

PERSONALIZED DRINKING CUP WITH FINGERPRINT READER

CROSS-REFERENCE TO RELATED APPLICATION

This application claims the benefit of priority of U.S. Provisional Application No. 63/062,273, filed Aug. 6, 2020, the contents of which are herein incorporated by reference.

BACKGROUND OF THE INVENTION

The present invention relates to drinking cups, and more particularly to a personalized drinking cup with a fingerprint reader.

In all social settings a beverage bottle or cup is usually involved. In any social gathering, where there are greater than one person, such as play groups with small children, school settings and events, sporting events, exercise classes, family outings, social friend outings, or other social gathering, the risk of picking up another's cup and sipping by mistake is high. Therefore, risking the chance of germ spread of the common cold, virus or flu, is high as a result of making such a mistake. Usually it is not until after the fact that one realizes what they have just done, and they have mistakenly just been subjected to another's germs.

A need exists for a solution to the problem of mistakenly picking up the cup of another. A further need exists for a personalized drinking cup capable of use only by its owner.

SUMMARY OF THE INVENTION

Advantageously, in one aspect, the present invention provides a solution to the problem of mistakenly picking up the drinking cup of another.

In one aspect the present invention provides a drinking cup comprising a lid or cap with a fingerprint reader associated therewith capable of use to enable only the cup owner to use the cup. The drinking cup provides ownership access to the mouthpiece of the cup for drinking purposes. Once the fingerprint reader is read, the mouthpiece will open for use of the cup.

In a further aspect the present invention provides a drinking cup which provides a handle including a fingerprint reader associated therewith. The cup provides ownership access to the mouthpiece for drinking purposes. Once the fingerprint reader is read the mouthpiece will open for use of the cup.

These and other features, aspects and advantages of the present invention will become better understood with reference to the following drawings, description and claims.

BRIEF DESCRIPTION OF THE DRAWINGS

The preferred embodiment of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION OF THE INVENTION

Figure 1:
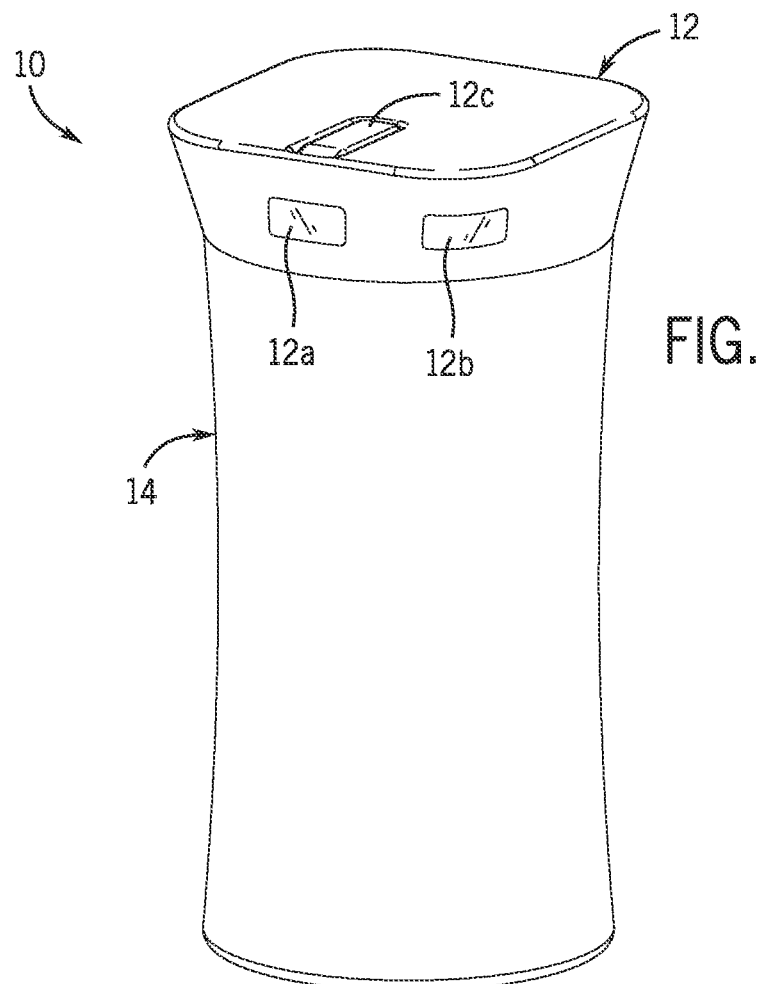
FIG. 1 is a front perspective view of the invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

As used herein, "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, as there is no intention to be bound by any express or implied theory presented in the preceding technical field, background, brief summary or the following detailed description, it is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Broadly, one embodiment of the present invention provides a personal drinking cup with a fingerprint reader device.

In an exemplary embodiment, the present invention provides a personal drinking cup assembly comprising a lower cup, an upper lid and a fingerprint reader device. The fingerprint reader device may be provided in the upper lid. The upper lid may include a handle, and the fingerprint reader may be located in the handle.

The present invention may assist in preventing the spread of germs by permitting only the owner of the cup enable the opening of the cup to sip from it, through use of the fingerprint reader. Therefore if another picks up a cup that is not their own, that person will not be permitted to use the cup, thereby reducing the spread of germs.

The present invention distinguishes over and differs from previous solutions. The present invention provides a personalized drinking cup that has a fingerprint reader in the lid, or the handle of the lid, for ownership access to the mouthpiece for drinking purposes. Once the fingerprint reader is read, the mouthpiece will open for consumption.

The present invention provides a cup having an unprecedented cap with a fingerprint actuated mouthpiece spout. This unprecedented feature will allow only the owner access to the mouthpiece.

In an exemplary embodiment, the present invention may provide a personalized drinking cup including one or more of the following components and combinations thereof.

a lower cup having a cup interior threaded structure at an upper opening thereof;

an upper lid including an exterior side wall with a recessed side wall threaded portion further comprising lid exterior threads configured to engage with the cup interior threaded structure to secure the upper lid to the lower cup;

a handle provided on the upper lid;

a battery operated fingerprint reader located on the upper lid, provided at the upper lid sidewall or the handle;

a battery; and a mouthpiece provided on the upper lid for drinking therefrom, the mouthpiece being operably connected to the fingerprint reader, which is capable of identifying an authorized user of the cup and opening the mouthpiece.

Figure 2:
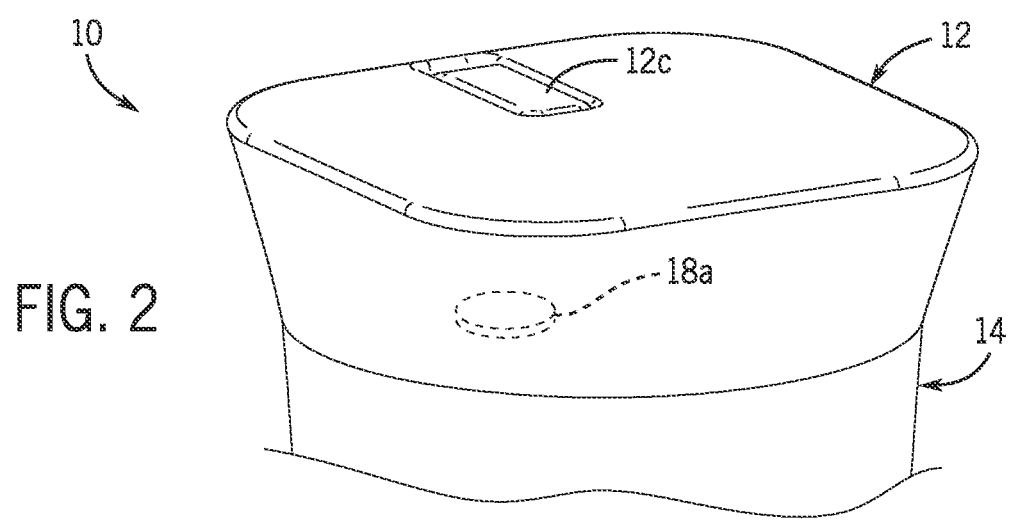
FIG. 2 is a rear perspective detail view of the invention.
Figure 3:
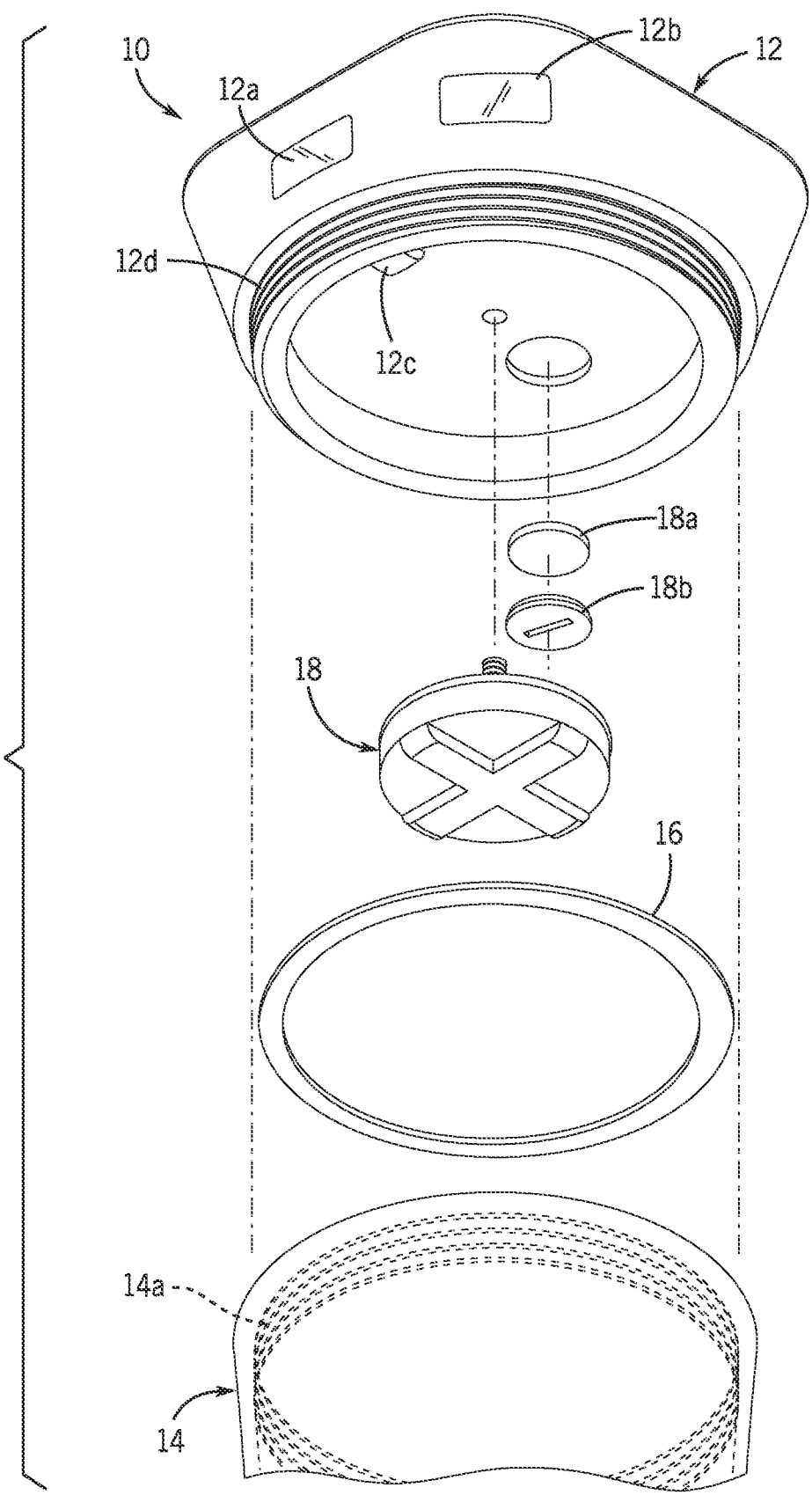
FIG. 3 is an exploded detail bottom perspective view.
Figure 4:
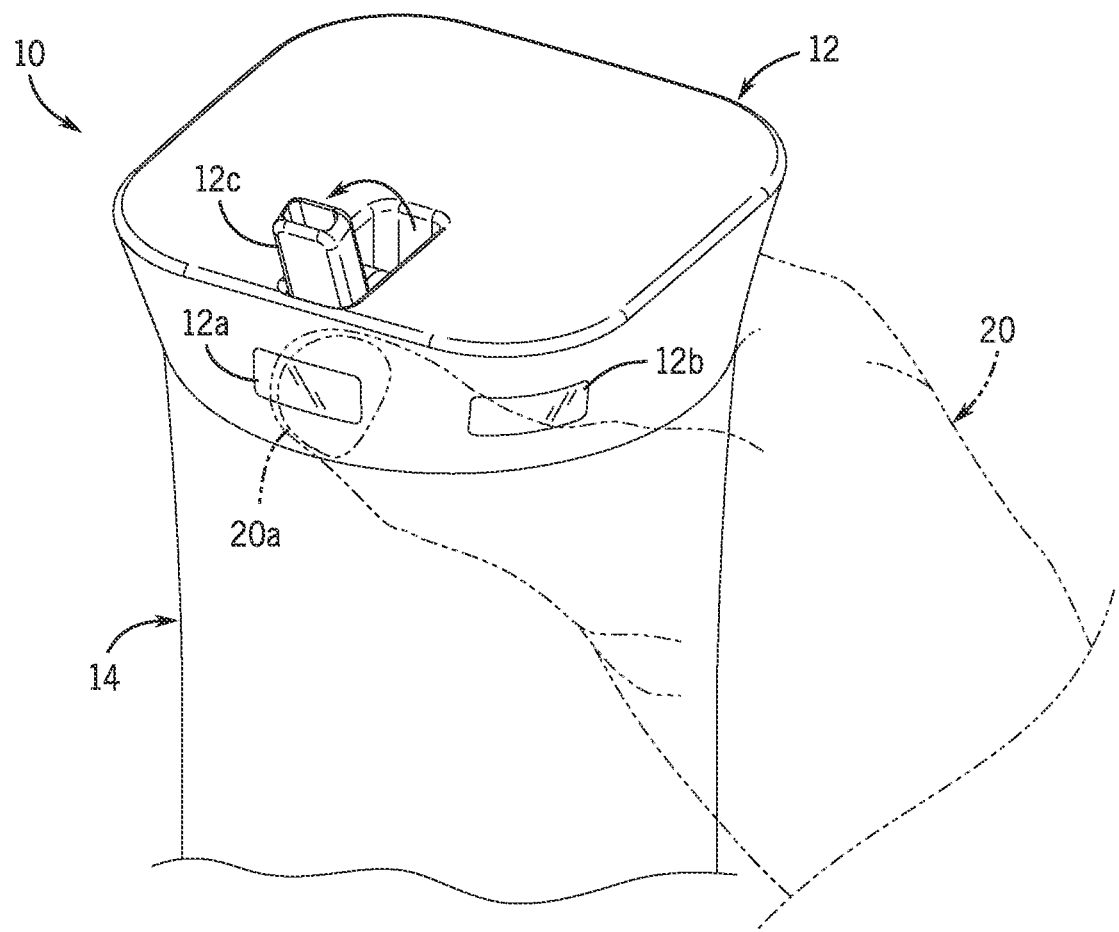
FIG. 4 is a perspective detail view of the invention in use.

Referring to the Figures, a personal drinking cup assembly is shown generally at 10. FIG. 1 shows a front perspective view of the invention. FIG. 2 provides a rear perspective detail view of the invention. FIG. 3 is an exploded detail bottom perspective view. FIG. 4 is a perspective detail view of the invention in use.

As seen at FIG. 1, the personal drinking cup assembly 10 includes an upper lid 12 and a lower cup 14. As shown at FIG. 3, the lower cup 14 has a cup interior threaded structure 14a or ridges at an upper opening thereof. Also seen at FIG. 3, the upper lid 12 includes an exterior side wall with a recessed side wall threaded portion further comprising lid exterior threads 12d configured to engage with the cup interior threaded structure 14a to secure the upper lid 12 to the lower cup 14. A seal 16 is located between the upper lid 12 and the lower cup 14. The upper lid 12 comprises a screw-on cap which fits on the lower cup 14 with a twisting motion.

The upper lid 12 includes a mouthpiece 12c. The mouthpiece 12 is actuated by a battery operated fingerprint reader. The personal drinking cup assembly includes at least one fingerprint reader. The embodiment at FIGS. 1-4, includes a first fingerprint reader 12a and a second fingerprint reader 12b located on the sidewall of the upper lid 12, which area powered by a battery 18a. In some embodiments the battery operated fingerprint reader may include a removable cover.

Referring again to FIG. 3, the battery compartment 18, battery 18a and battery cover 18b are shown. Battery 18a is removably located in the battery compartment and covered by battery cover 18b. Battery 18a is removably located therein. The battery compartment 18 is water tight.

Figure 5:
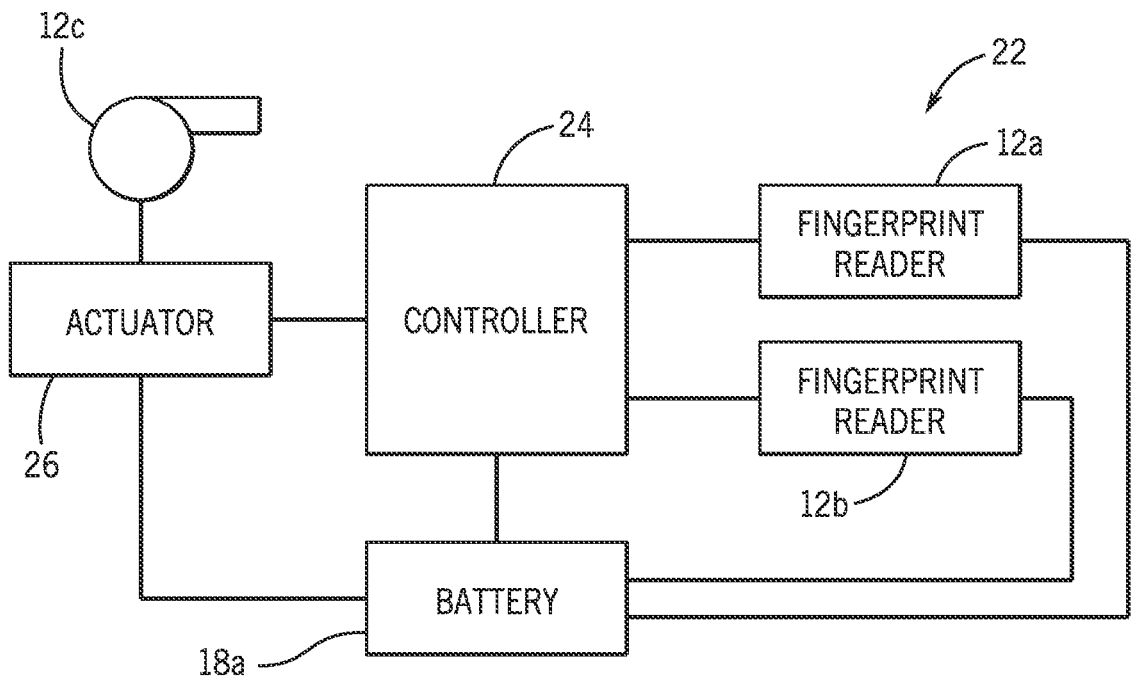
FIG. 5 is a schematic diagram.

As seen at FIG. 4, in use, the fingerprint reader may be activated by removing a strip from the battery 18a. FIG. 5 provides a schematic diagram of the fingerprint reader. The mouthpiece 12c is operably connected to an actuator 26 and the battery. The actuator is operably connected to the battery and the at least one fingerprint reader 12a, 12b. The at least one fingerprint reader 12a, 12b is operably connected to the battery.

The user 20 (shown in phantom) may then place a finger 20a (shown in phantom) over one of the fingerprint readers 12a, 12b to be read. Once the fingerprint is read by the fingerprint reader, the mouthpiece 12c is actuated. The mouthpiece may be pivotally mounted. In response to the actuation by the fingerprint reader, the mouthpiece may be released and pivoted upward to enable the user to drink from the personal drinking cup assembly. After the user finishes using the personal drinking cup assembly to consume a beverage contained therein, the user may remove the finger 20a from the fingerprint reader, and the mouthpiece 12c will then close.

Figure 6:
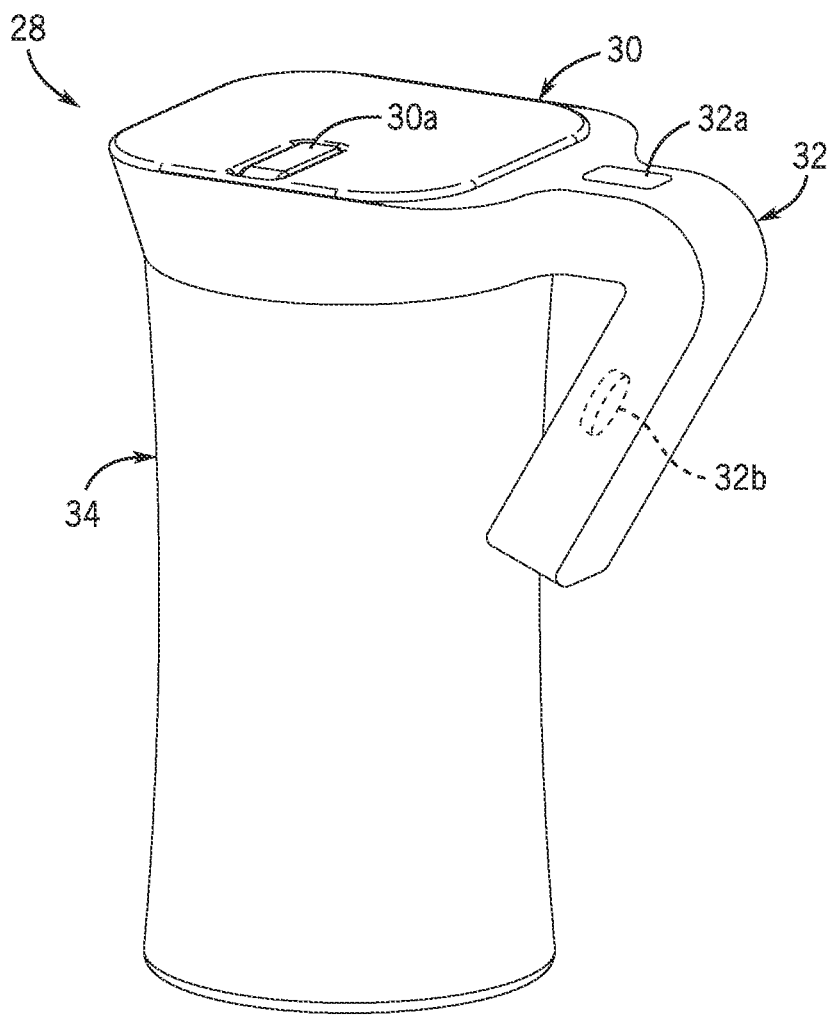
FIG. 6 is a perspective view of a second embodiment of the invention shown with a handle.

In an alternative embodiment shown at FIG. 6, personal drinking cup assembly 28, having an upper lid 30 and a lower cup 34. The upper lid 30 includes a mouthpiece 30a and a handle 32. The handle includes a battery operated fingerprint reader 32a and a battery 32b.

Figure 7:
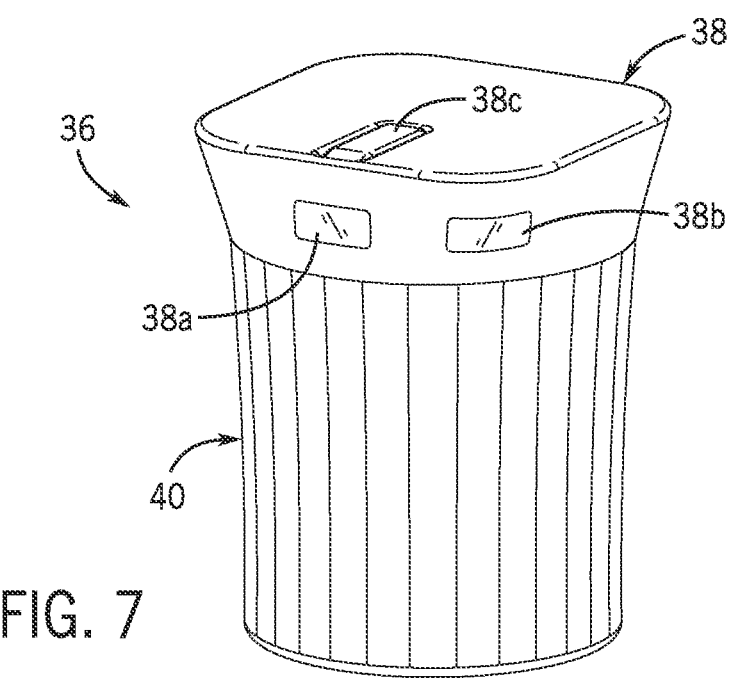
FIG. 7 is a perspective view of yet another embodiment the invention shown as a children's cup.

In a further alternative embodiment shown at FIG. 7 provides a children's cup 36 including a lower cup 40 or base, an upper lid 38 including a first fingerprint reader 38a, a second fingerprint reader 38b, and a mouthpiece 38c.

In an exemplary embodiment the personal drinking cup assembly and the components thereof may be made of any suitable material by any suitable fabrication process.

In summary, in an exemplary embodiment, the present invention provides a personal drinking cup assembly comprising a lower cup, an upper lid and a fingerprint reader device. The lower cup comprises a cup base, a cup side wall extending upwardly from the cup base, and a cup mouth further comprising an interior threaded structure on an inner surface thereof. The upper lid comprises a screw-on lid constructed and arranged to removably cover the lower cup. The upper lid further comprises an upper lid top, an exterior surface, an interior surface, a lid side wall with a recessed side wall threaded portion further comprising lid exterior threads configured to engage with the cup interior threaded structure to secure the upper lid to the lower cup portion, and a mouthpiece for drinking therefrom. The fingerprint reader device is located on the exterior surface of the upper lid, and is operably connected to the mouthpiece and capable of identifying an authorized user of the cup and opening the mouthpiece.

In an exemplary embodiment, the mouthpiece is pivotally mounted to the upper lid top of the upper lid. The upper lid further comprises a mouthpiece release element capable of permitting the mouthpiece to be opened for use. The fingerprint reader device includes at least one fingerprint reader element capable of reading a fingerprint and identifying the authorized user. The fingerprint reader device is operably connected to the mouthpiece release element. In response to an authorized user placing a finger on the at least one fingerprint reader element, the fingerprint reader device identifies the authorized user and actuates the mouthpiece release element, causing the mouthpiece to be opened for use by the authorized user of the personal drinking cup assembly for drinking therefrom.

In some embodiments, the at least one fingerprint reader element comprises a first fingerprint reader element and a second fingerprint reader element. In response to the authorized user placing a finger on at least one of the first fingerprint reader element and the second fingerprint reader element, the fingerprint reader device identifies the authorized user and actuates the mouthpiece release element, causing the mouthpiece to be opened for use by the authorized user of the personal drinking cup assembly for drinking therefrom.

In some embodiments, the personal drinking cup assembly further comprising a sealing ring disposed between the lower cup and the upper lid. The upper lid further includes a circular shoulder adjacent to the recessed side wall threaded portion, the circular shoulder configured to bear against the sealing ring when the upper lid is secured to the lower cup to provide a water tight seal between the upper lid and the lower cup.

The personal drinking cup assembly further comprises a battery power source operably connected to the fingerprint reader device. The upper lid includes a waterproof interior battery compartment having a battery compartment door. The battery power source comprises a removable, replaceable battery constructed and arranged to fit in the interior battery compartment.

In some embodiments of the personal drinking cup assembly the fingerprint reader device is located on the exterior surface of the upper lid at the side wall thereof.

In other embodiments, the upper lid further comprises a handle. The fingerprint reader device is located on the exterior surface of the upper lid, on the handle. The waterproof battery compartment is located in the handle of the upper lid.

It should be understood, of course, that the foregoing relates to exemplary embodiments of the invention and that modifications, variations and changes in detail may be made without departing from the spirit and scope of the invention as set forth in the following claims.

What is claimed is:

1. A personal drinking cup assembly comprising
   a lower cup comprising a cup base, a cup side wall extending upwardly from the cup base, and a cup mouth further comprising an interior threaded structure on an inner surface thereof;
   an upper lid comprising a screw-on lid constructed and arranged to removably cover the lower cup, the upper lid comprising an upper lid top, an exterior surface, an interior surface, a lid side wall with a recessed side wall threaded portion further comprising lid exterior threads configured to engage with the cup interior threaded structure to secure the upper lid to the lower cup portion, and a mouthpiece for drinking therefrom;
   a fingerprint reader device located on the exterior surface of the upper lid, the fingerprint reader device operably connected to the mouthpiece and capable of identifying an authorized user of the cup and opening the mouthpiece;
   wherein the mouthpiece is pivotally mounted to the upper lid top of the upper lid; and the upper lid further comprises a mouthpiece release element capable of permitting the mouthpiece to be opened for use;
   wherein the fingerprint reader device includes at least one fingerprint reader element capable of reading a fingerprint and identifying the authorized user; and
   the fingerprint reader device is operably connected to the mouthpiece release element,
   whereby in response to an authorized user placing a finger on the at least one fingerprint reader element, the fingerprint reader device identifies the authorized user and actuates the mouthpiece release element, causing the mouthpiece to be opened for use by the authorized user of the personal drinking cup assembly for drinking therefrom.

2. The personal drinking cup assembly of claim 1 wherein:
   the at least one fingerprint reader element comprises a first fingerprint reader element and a second fingerprint reader element; and
   in response to the authorized user placing a finger on at least one of the first fingerprint reader element and the second fingerprint reader element, the fingerprint reader device identifies the authorized user and actuates the mouthpiece release element, causing the mouthpiece to be opened for use by the authorized user of the personal drinking cup assembly for drinking therefrom.

3. The personal drinking cup assembly of claim 1 further comprising a sealing ring disposed between the lower cup and the upper lid.

4. The personal drinking cup assembly of claim 3 wherein the upper lid further includes a circular shoulder adjacent to the recessed side wall threaded portion, the circular shoulder configured to bear against the sealing ring when the upper lid is secured to the lower cup to provide a water tight seal between the upper lid and the lower cup.

5. The personal drinking cup assembly of claim 1 wherein the personal drinking cup assembly further comprises a battery power source operably connected to the fingerprint reader device.

6. The personal drinking cup assembly of claim 5 wherein:
   the upper lid includes a waterproof interior battery compartment having a battery compartment door; and
   the battery power source comprises a removable, replaceable battery constructed and arranged to fit in the interior battery compartment.

7. The personal drinking cup assembly of claim 5 wherein the fingerprint reader device is located on the exterior surface of the upper lid at the side wall thereof.

8. The personal drinking cup assembly of claim 5 wherein the upper lid further comprises a handle and the fingerprint reader device is located on the exterior surface of the upper lid, on the handle thereof.

9. The personal drinking cup assembly of claim 8 wherein the waterproof battery compartment is located in the handle of the upper lid.

\* \* \* \* \*